(12) United States Patent
Haahr et al.

(10) Patent No.: US 10,100,804 B2
(45) Date of Patent: Oct. 16, 2018

(54) WIND TURBINE ROTOR BLADE WITH A CONE ANGLE AND A METHOD OF MANUFACTURING A WIND TURBINE ROTOR BLADE WITH A CONE ANGLE

(71) Applicant: Vestas Wind Systems A/S, Aarhus N. (DK)

(72) Inventors: Arne Haahr, Ringkobing (DK); Zhen-Zhe Chen, Ringkøbing (DK); Manikandan Rajagopal, Chennai (IN)

(73) Assignee: Vestas Wind Systems A/S, Aarhus N. (DK)

( * ) Notice: Subject to any disclaimer, the term of this patent is extended or adjusted under 35 U.S.C. 154(b) by 1099 days.

(21) Appl. No.: 14/367,546

(22) PCT Filed: Dec. 10, 2012

(86) PCT No.: PCT/DK2012/050457
§ 371 (c)(1),
(2) Date: Jun. 20, 2014

(87) PCT Pub. No.: WO2013/091635
PCT Pub. Date: Jun. 27, 2013

(65) Prior Publication Data
US 2015/0159624 A1    Jun. 11, 2015

Related U.S. Application Data

(60) Provisional application No. 61/578,624, filed on Dec. 21, 2011.

(30) Foreign Application Priority Data

Dec. 21, 2011    (DK) ................................ 2011 70745

(51) Int. Cl.
*F03D 1/06*    (2006.01)
*F03D 7/02*    (2006.01)
*B23P 15/02*    (2006.01)

(52) U.S. Cl.
CPC ............ *F03D 1/0658* (2013.01); *B23P 15/02* (2013.01); *F03D 1/0633* (2013.01);
(Continued)

(58) Field of Classification Search
CPC .......... F05B 2250/314; F05B 2240/313; F05B 2240/312; F03D 1/0658; F03D 1/0633; F03D 7/0224; B23P 15/02
See application file for complete search history.

(56) References Cited

U.S. PATENT DOCUMENTS 7,802,968 B2 *   9/2010   Jacobsen ................. F03D 1/065
                                           416/226
9,074,581 B2 *   7/2015   Bagepalli .............. F03D 1/0658
(Continued)

FOREIGN PATENT DOCUMENTS

DE       102006041383 A1    3/2008
EP         2336553 A2    6/2011

OTHER PUBLICATIONS

European Patent Office, Examination Report in EP Application No. 12805930.0, dated Feb. 6, 2017.
(Continued)

*Primary Examiner* — Logan Kraft
*Assistant Examiner* — Eric Zamora Alvarez
(74) *Attorney, Agent, or Firm* — Wood Herron & Evans LLP

(57) ABSTRACT

A wind turbine rotor blade (14) comprising a root portion (15) having a substantially cylindrical shape and a longitudinal axis (22), the root portion having a mounting face (25); a plurality of bores (26) in a wall of the root portion and
(Continued)

extending from the mounting face into the root portion, the bores being configured to receive respective connecting means for connecting the wind turbine rotor blade to a wind turbine hub; wherein the plurality of bores are inclined at an angle relative to the longitudinal axis of the root portion to define a cone angle.

15 Claims, 7 Drawing Sheets

(52) U.S. Cl.
CPC ......... *F03D 1/0675* (2013.01); *F03D 7/0224* (2013.01); *F05B 2230/10* (2013.01); *F05B 2240/30* (2013.01); *F05B 2250/314* (2013.01); *F05B 2260/301* (2013.01); *F05B 2260/79* (2013.01); *Y02E 10/721* (2013.01); *Y02E 10/726* (2013.01); *Y02P 70/523* (2015.11); *Y10T 29/49336* (2015.01)

(56) References Cited

U.S. PATENT DOCUMENTS

| | | | | |
|---|---|---|---|---|
| 2008/0112813 A1* | 5/2008 | Rochholz | .............. | F03D 1/0633 416/239 |
| 2009/0304513 A1* | 12/2009 | Jacobsen | ............... | F03D 1/0608 416/204 R |
| 2011/0142645 A1* | 6/2011 | Nunez Polo | .......... | F03D 1/0658 416/149 |

OTHER PUBLICATIONS

International Searching Authority, International Search Report and Written Opinion issued in corresponding PCT Application No. PCT/DK2012/050457 dated Feb. 28, 2013, 12 pages.

Danish Patent and Trademark Office, Combined search and examination report issued in corresponding DK application No. PA 2011 70745 dated Jul. 17, 2012, 4 pages.

* cited by examiner

WIND TURBINE ROTOR BLADE WITH A CONE ANGLE AND A METHOD OF MANUFACTURING A WIND TURBINE ROTOR BLADE WITH A CONE ANGLE

The present invention relates to a wind turbine rotor blade and a method of manufacture of a wind turbine rotor blade. In particular, the present invention relates to a wind turbine rotor blade having a cone angle and method of manufacturing a wind turbine rotor blade with a cone angle.

Modern wind turbines may have a rotor diameter of over 100 meters. Although rotor blades are designed with a certain rigidity, the rotor blades do deform under wind loads. In an upwind horizontal axis wind turbine, the force of the oncoming wind pushes the tips of the rotor blades towards the tower and there is potential risk of the blade tips striking the tower under high wind loads. One way of increasing the distance between the blade tip and the tower is to orientate the blades with a so-called "cone angle". In a horizontal axis wind turbine, a plurality (typically three) of rotor blades mounted on a hub rotate about a substantially horizontal axis, and the cone angle is formed by mounting the blades such that a longitudinal axis of the blade is not perpendicular to the rotational axis of the rotor.

It is the aim of the present invention to provide a wind turbine rotor blade having a cone angle and a method of manufacturing of a wind turbine rotor blade having a cone angle.

According to a first aspect of the present invention there is provided a wind turbine rotor blade comprising: a root portion having a substantially cylindrical shape and a longitudinal axis, the root portion having a mounting face; a plurality of bores in a wall of the root portion and extending from the mounting face into the root portion, the bores being configured to receive respective connecting means for connecting the wind turbine rotor blade to a wind turbine hub; wherein the plurality of bores are inclined at an angle relative to the longitudinal axis of the root portion to define a cone angle.

By providing bores in the root portion of the wind turbine blade inclined at an angle relative to the longitudinal axis of the root portion provides a blade with an inherent cone angle. Therefore, there is no need to insert any wedge shaped spacers or the like between the blade and the wind turbine hub in order to provide a cone angle.

Preferably the longitudinal axis of the root portion is inclined relative to a pitch axis of the rotor blade.

Preferably the mounting face is in a plane that is inclined so that it is not normal to the longitudinal axis of the root portion.

Preferably the root portion has a substantially circular cross section and the plurality of bores are formed in a circle around a centre point; and the centre point is offset from the longitudinal axis of the root portion.

The plurality of bores may be inclined at an angle relative to the longitudinal axis of the root portion to define a sweep angle.

The plurality of bores may be inclined relative to the longitudinal axis at an angle of between 1 degree and 5 degrees.

According to the invention there is also provided a wind turbine comprising: a tower; a nacelle connected to the top of the tower; a hub connected to the nacelle and a blade bearing connected to the hub; and a wind turbine rotor blade as defined in the first aspect of the invention mounted on the blade bearing.

Preferably the plurality of bores in the wind turbine rotor blade are inclined at an angle relative to the longitudinal axis of the root portion, such that a tip end of the blade is angled away from the tower.

Preferably the root portion of the rotor blade rotates in a first plane and a tip end of the blade rotates in a second plane, wherein the second plane is located upwind of the first plane.

Preferably the blade bearing is orientated such that a tip end of the blade is angled away from the tower.

According to a second aspect of the present invention there is provided a method of manufacturing a wind turbine rotor blade with a cone angle comprising the steps of: providing a wind turbine rotor blade having a root portion with a substantially cylindrical shape and a longitudinal axis; removing material from the root portion to provide a mounting face; forming a plurality of bores in a wall of the root portion extending from the mounting face into the root portion, the bores being configured to receive respective connecting means for connecting the wind turbine rotor blade to a wind turbine hub; wherein the step of forming the plurality of bores comprises forming the bores such that they are inclined at an angle relative to the longitudinal axis of the root portion to define the cone angle.

The blade may be inclined at an angle prior to the steps of removing material and forming the plurality of bores.

The step of forming the plurality of bores may take place prior to the step of removing material from the root portion to provide the mounting face.

Preferably the step of removing material from the root portion to provide the mounting face comprises grinding an end the root portion.

Preferably the step of forming the plurality of bores comprises drilling.

The present invention will now be described by way of example only with reference to the accompanying Figures, in which.

Figure 1:
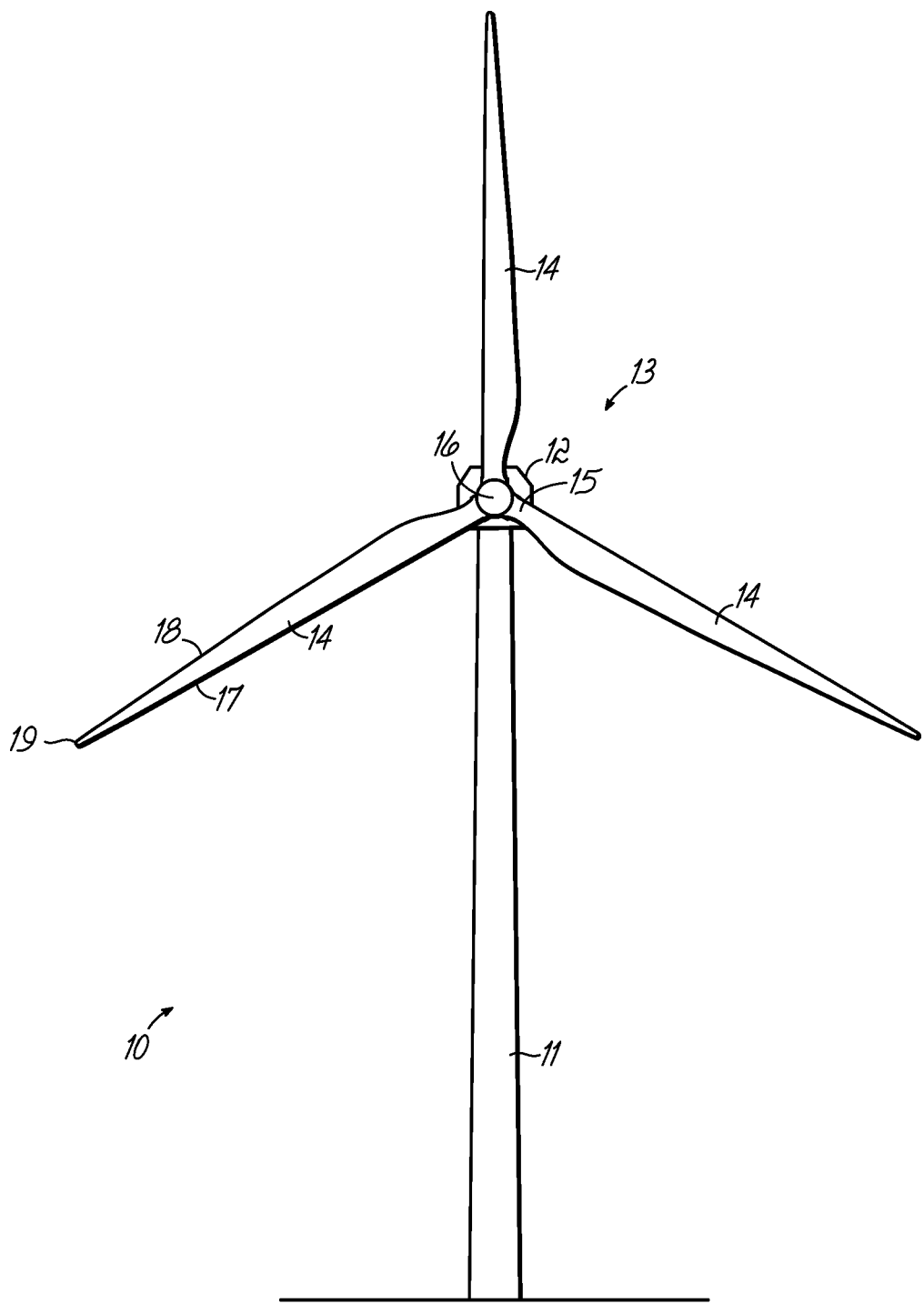
FIG. 1 shows a front view of a wind turbine.

FIG. 1 is a front view of a horizontal axis wind turbine 10. The turbine comprises a tower 11 which supports a nacelle 12. The wind turbine 10 comprises a rotor 13 made up of three blades 14 each having a root portion 15 mounted on a hub 16. Each blade 14 comprises a leading edge 17, a trailing edge 18 and a tip 19.

Figure 2:
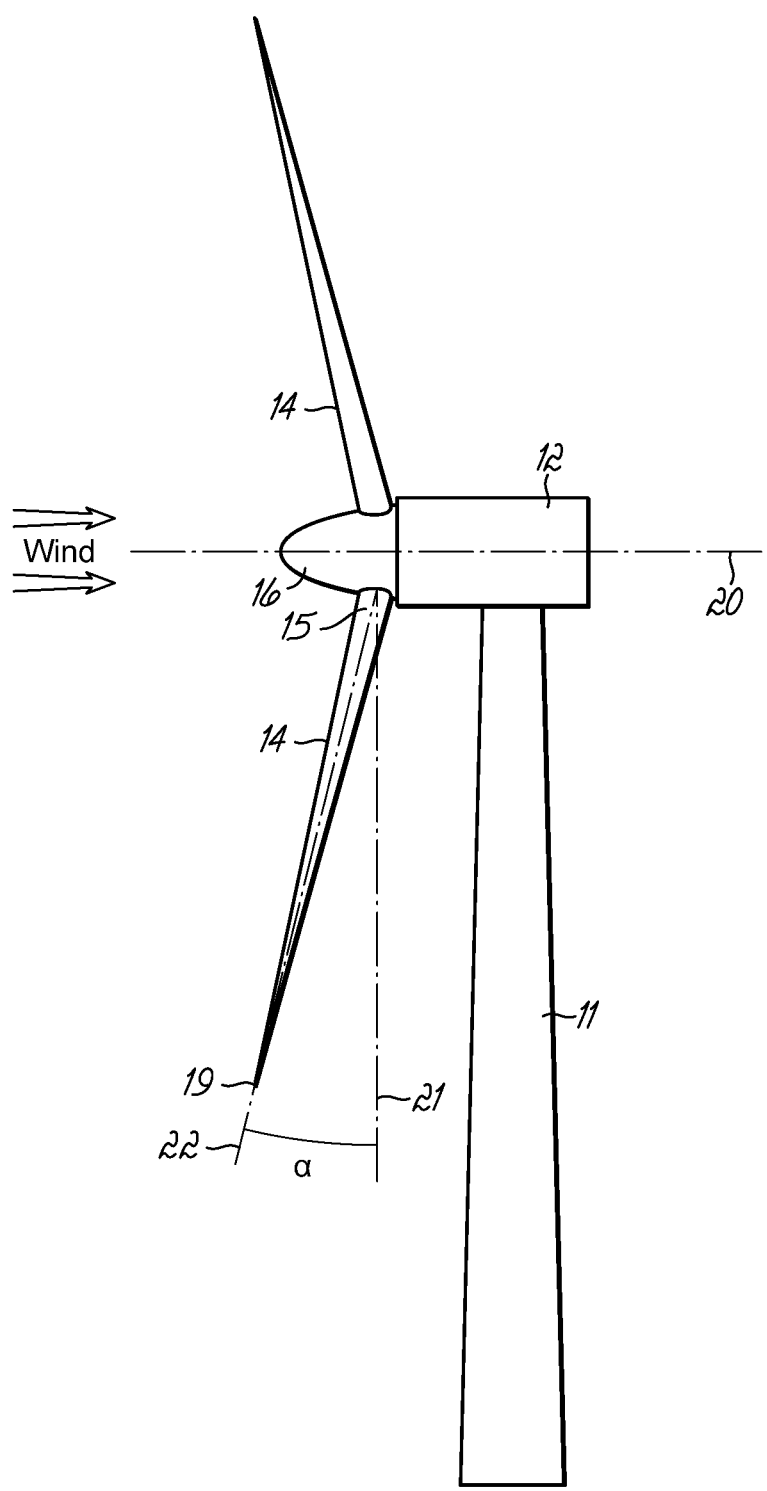
FIG. 2 shows a side view of a wind turbine according to the invention.

FIG. 2 shows a side view of the wind turbine 10. The rotor 13 comprising the blades 14 and the hub 16 rotates about a substantially horizontal axis 20. The blades are orientated so that they are inclined at an angle α relative to an axis 21 which extends perpendicular to the rotational axis 20. The angle α is formed between the axis 21 and a blade axis 22. The blade axis 22 extends from the root portion 15 to the tip 19 (although as will be described later with reference to FIG. 10b the blade axis 22 does not actually have to extend through the blade and the tip).

As can be seen from FIG. 2, the provision of the cone angle α displaces the tip of the blade relative to the tower 11, by moving the tip of the blade away from the tower in an upwind direction. It should be appreciated that the cone angle α shown in FIG. 2 is exaggerated for clarity. The result of the cone angle α is that the root portion 15 of the blade rotates on a first rotation plane and the tip 19 rotates on a second rotation plane, where the second rotation plane is upwind of the first rotation plane.

As is well known in the art, a wind turbine rotor blade can rotate about a pitch axis in order to regulate the power output of the wind turbine and the loads experienced by the wind turbine components. In a wind turbine where there is no cone angle, and the blade axis 22 is normal to the rotational axis of the rotor 20, the blades will pitch about the blade axis 22. However, in the present invention, where a cone angle α is provided, the pitch axis is not coincident with the blade axis. In this example, the pitch axis is coincident with the axis 21, as described in relation to FIG. 5 below.

Figure 3:
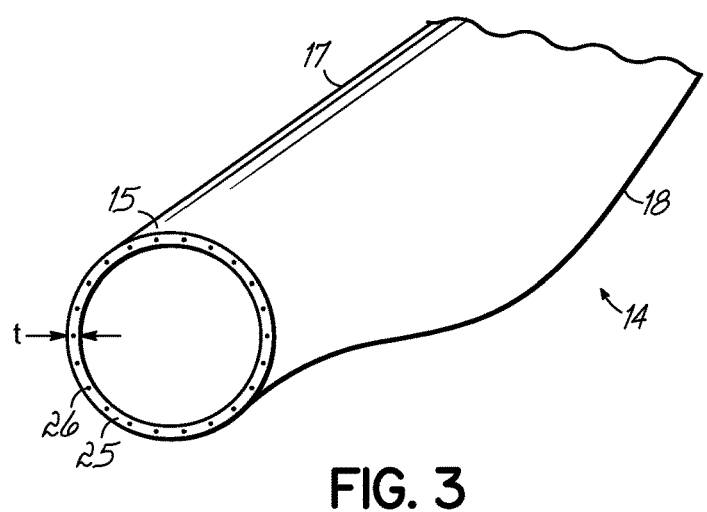
FIG. 3 shows a partial view of a wind turbine rotor blade according to the invention.

FIG. 3 shows a partial view of a wind turbine blade 14. The blade is formed as a hollow structure and at the root portion 15 of the blade, the cross-section of the blade is substantially circular. The root portion 15 is hollow and has a wall thickness as indicated by "t" in FIG. 3. The end face of the root portion 15 defines a mounting face 25 (or flange) for connecting the blade 14 to the hub 16. Bores 26 are provided in the mounting face 25 and extend into the root portion 15, in the spanwise direction, towards the tip 19 of the rotor blade 14. The bores 26 are configured to receive connecting means, in this example bolts, to connect the wind turbine blade 14 to the hub 16.

Inserts (which are not shown in the Figures) are provided in the bores to receive the bolts which connect the blade 14 to the hub 16. The inserts are hollow steel cylinders which are bonded into the bores 26 with an epoxy adhesive. An internal thread is provided in the insert to receive the threaded bolt to attach the blade to the hub.

Figure 4:
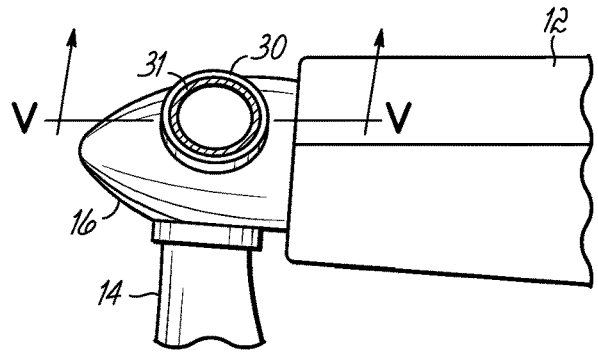
FIG. 4 shows a partial view of a wind turbine nacelle and hub according to the invention.

FIG. 4 shows a view from above the wind turbine nacelle 12. The hub 16 is shown with one blade attached and the blade that would be pointing in the upward position is not shown for clarity. The blades 14 are received in the hub 16 in an aperture 30 which houses a bearing 31. The bearing 31 is a pitch bearing 31 and is configured to allow the rotor blade to rotate about an axis perpendicular to the bearing 31 to allow the power out of the wind turbine and the wind loads on the rotor 13 to be regulated during use, as is well known in the art.

Figure 5:
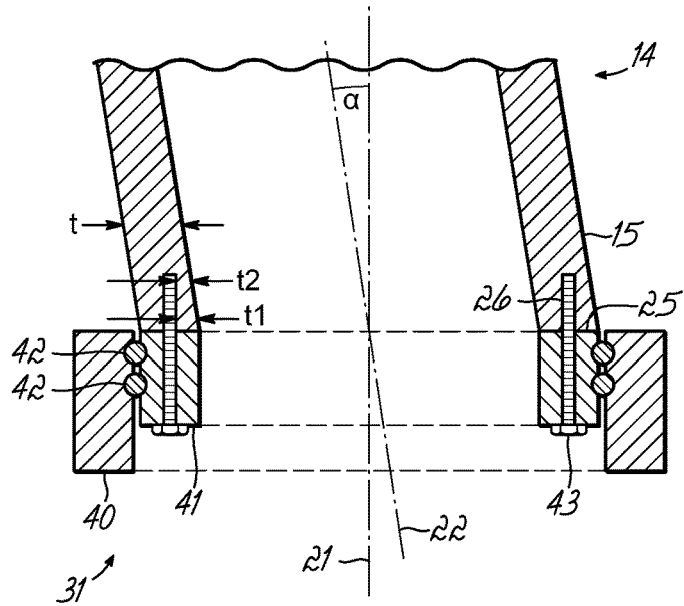
FIG. 5 shows a cross-section through a blade bearing along the line V-V of FIG. 4.

FIG. 5 shows a cross-section through the bearing 31 and the root portion 15 of the blade 14 along the line V-V as shown in FIG. 4. As can be seen in FIG. 5, the bearing 31 comprises an outer bearing ring 40 and an inner bearing ring 41, which can rotate within the outer bearing ring 40. Bearing rolling elements 42 are located between the outer ring 40 and the inner ring 41 as well known in the art. The outer ring 40 is connected to the hub 16 and does not rotate relative to the hub 16.

The blade 14 is connected to the inner bearing ring 41 by bolts 43 which extend through apertures in the inner bearing ring 41 into the bores 26 and the inserts (not shown) of the root portion 15 of the blade 14. The mounting face 25 abuts a corresponding mounting face of the inner bearing ring 41.

FIG. 5 is just one example of a pitch bearing 3 and the skilled person will realise that other bearing arrangements are possible, such as an arrangement where the outer bearing ring supports the wind turbine blade 14 and the inner bearing ring is connected to the hub 16. Different arrangements of rolling elements 42 may also be envisaged.

As described with reference to FIG. 3, the root portion 15 of the blade is cylindrical. The longitudinal axis of the cylinder in the root portion 15 defines the blade axis 22. Outboard of the root portion 15, towards the tip 19, the blade shape changes so that there is no longer a cylindrical cross-section as the blade transitions to an aerodynamic cross-section and it is important to note that the blade axis 22 is defined according to the cylindrical root portion 15, rather than outboard regions of the blade. The pitch axis 21 of the blade 14 is coaxial with the axis through the centre of the bearing 31.

As can be seen in FIG. 5, the cone angle α of the blade 14 is achieved by aligning the bores 26 in the root portion 15 of the blade 14 relative to the blade axis 22. The angle formed between the longitudinal axes of the bores 26 and the blade axis 22 defines the cone angle α. The bores 26 extend from the mounting face 25 into the root portion 15 and because they are aligned at an angle relative to the blade axis 22, the distance between the bores 26 and an inner/outer surface of the root portion 15 varies. For example the distance between the inner surface of the bore 26 and the inner surface of the root portion 15 adjacent to the mounting face 25 is defined in FIG. 5 as t1 on the left hand side of FIG. 5. The distance between the inner surface of the bore 26 and the inner surface of the root portion 15 at the distal end (that is the end furthest away from the mounting face) of the bore 26 is defined as t2 on the left hand side of FIG. 2, and it can clearly be seen that distance t2 is less than distance t1. For the bore 26 shown on the left hand side of FIG. 5, care must be taken during design of the wind turbine blade 14 to ensure that the distance t2 is sufficient for strength purposes.

Figure 6A:
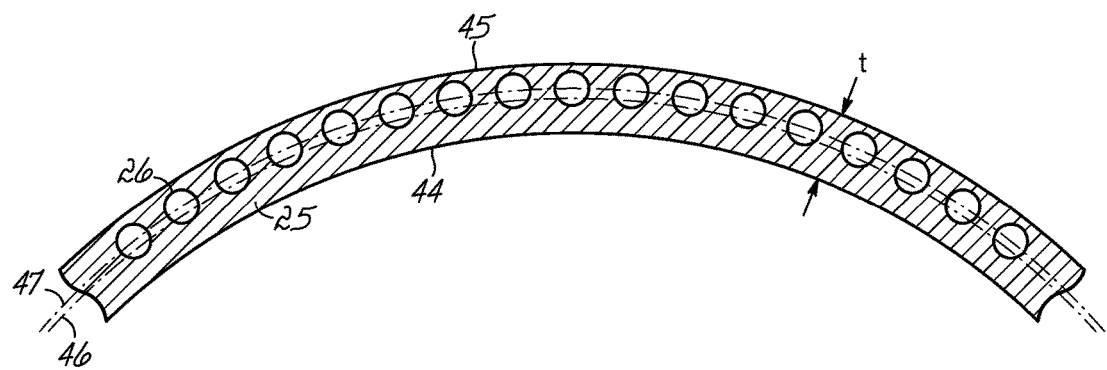
FIG. 6A shows a partial view of the end of a wind turbine blade.
Figure 6B:
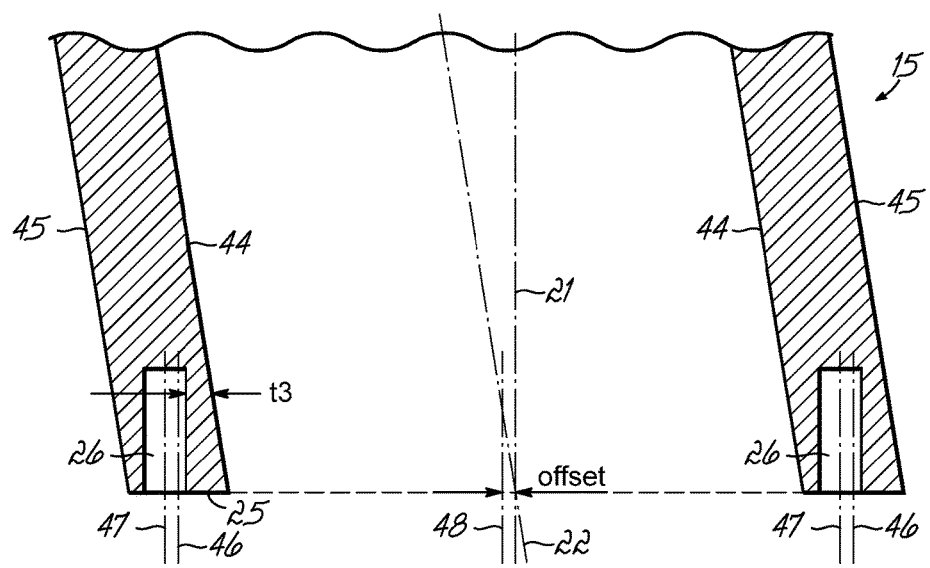
FIG. 6B shows a cross-section view along the line V-V of FIG. 4.

FIGS. 6A and 6B show how the bores 26 are provided in the root portion 15 such that the distance t2 is sufficient for strength purposes. FIG. 6A shows a partial end view of the mounting face 25. The root portion has a wall thickness t and the wall is formed between an inner cylindrical surface 44 and an outer cylindrical surface 45. The dotted curve 46 is mid-way between the inner surface 44 and the outer surface 45. Conventionally, the bores 26 would be provided so that the longitudinal axes of the bores are formed on this mid-way curve 46. However, as can be seen in FIG. 6A, the bores 26 are formed on an offset curve 47 which is orientated above the mid-way curve with respect to FIG. 6A. In this example, the root portion has a circular cross section so that the curves are 46 and 47 are circles. It is important to note that the offset circle 47 has the same diameter as the mid-point circle 46. The mid-point circle 46 is coaxial with blade axis 22. However, the central axis of the offset circle 47 is not coaxial with the blade axis 22. By forming the bores 26 such that their longitudinal axes' (that is their axes' in the spanwise direction of the blade) are located on the offset circle 47 the wall thickness between the bores 26 and the inner surface 44 and the outer surface 45 varies around the circumference of the root portion 15.

FIG. 6B shows this effect in a cross sectional view. As can be seen the offset circle 47 is offset to the left of the blade axis 22 on the mounting face 25 plane with respect to this Figure. The offset circle 47 has a central axis as indicated by line 48. The distance t3 between the distal end of the bore 26 and the inner surface 44 is increased because the bores 26 are offset from the mid-way line 46. By selection of the offset distance the distance t3 can be chosen so that it has sufficient strength to support the bore 26. If the bores 26 were not offset, then the distance t3 would be too small and there would not be sufficient material in this region to support the bores. It is noted that the offset circle is also offset with respect to the pitch axis 21.

The root portion 15 of wind turbines blades are often made by winding composite material (i.e. glass fibres in an epoxy resin) around a rotating mandrel. The composite material is wound onto the mandrel to form layers to build up the thickness of the part. When the winding process is completed, the composite material is cured on the mandrel and then the root portion 15 is removed from the mandrel. The number of windings that must be performed is carefully calculated to ensure that after the material is cured the root portion has the desired wall thickness t. By using the offset circle 47 as the reference point for the centre of the bores means that a new root portion does not need to be manufactured to achieve the wall thickness required so that there is sufficient strength around the bores. In other words, it would be possible to ensure that there is sufficient material around the bores 26 simply by making the wall thickness t greater than would be used on a conventional wind turbine blade without angled bores, but with the example shown in FIGS. 6A and 6B the same root portion can be used without having to increase the wall thickness.

In an example, the blade 14 is 50 meters in length, the root portion 15 has a diameter of 2 meters, the wall thickness t at the mounting flange 25 is 0.08 meters, the diameters of the bores are 0.05 meters, the length of the bores are 0.3 meters and the offset distance is 4 mm.

Figure 7A:
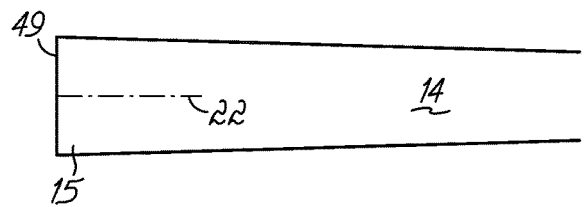
FIGS. 7A, 7B and 7C show manufacturing steps according to the invention.
Figure 7B:
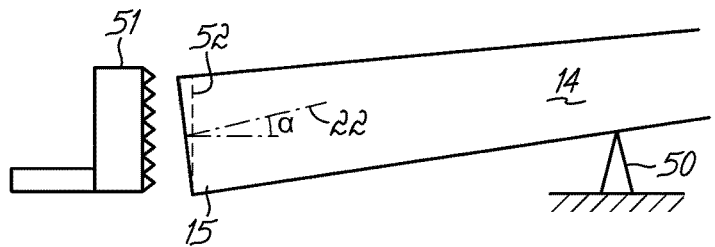
Figure 7C:
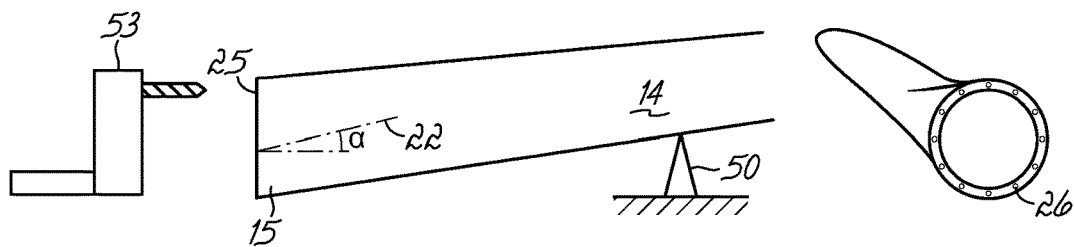

FIGS. 7A, 7B and 7C, show an example of how the cone angle may be achieved. FIGS. 7A, 7B and 7C show on the left-hand side a partial side view of the blade 14 and on the right hand side an end view of the blade. On the left hand side of the Figures, the view is looking towards the trailing edge and the windward surface is at the top, and the leeward surface is at the bottom. FIG. 7A shows the first step of the manufacturing process where a blade 14 has been constructed from composite material such as fibre glass. The details of manufacturing the blade 14 are not described here but are known to a person skilled in the art. In FIG. 7A, the end face 49 of the blade is perpendicular to the blade axis 22. In FIG. 7B, in the next step of the process, it can be seen that the blade is raised on a support 50 so that the tip end (not shown) of the blade is raised upwards. The blade 14 is raised so that it is inclined at the desired cone angle α. The end face of the blade 14 is presented to a grinding machine 51 which grinds the end face of the blade, in order to remove material from the root portion 15 so that the end face is now perpendicular to the ground. In FIG. 7B, the dashed line 52 indicates the extent of the grinding process. By grinding the end face 49 of the blade 14 when the blade is inclined at the cone angle α, the correct orientation of the mounting face 25 is achieved. The mounting face 25 is not perpendicular to the blade axis 22, but rather inclined at the cone angle with respect to the blade axis 22.

In the next step of the manufacturing process shown in FIG. 7C the blade 14 is presented to a drilling machine 53 which operates to construct the bores 26 in the mounting face 25. The drilling machine 53 carries out a process so that the bores 26 are provided around the circumference of the mounting face 25. With this process, the bores 26 extend into the root portion 15 perpendicular to the mounting face 25, but are orientated at the cone angle α relative to the blade axis 22. Of course, it would also be possible to carry out the drilling step prior to the grinding step.

It is also possible to provide the mounting face 25 and the bores 26 at the desired cone angle α without raising the blade 14 on a support 50. However, this would require that the grinding machine 51 and the drilling machine 53 are orientated at the correct cone angle. It has been described how the mounting face 25 is provided by removing material from the root portion 15 with a grinding machine 51. However, it is also possible to remove the material from the root portion 15 with other processing techniques, such as ultrasonic cutting.

The cone angle α that is applied to the blade is in this example 1 degree. However, cone angles of up to 5 degrees for example may be provided.

Figure 8:
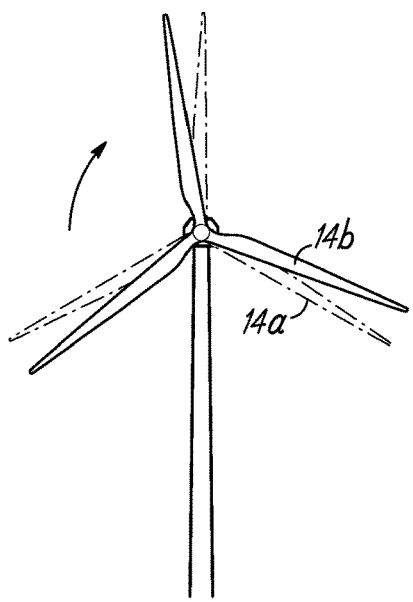
FIG. 8 shows a wind turbine according to the invention with sweep.
Figure 9:
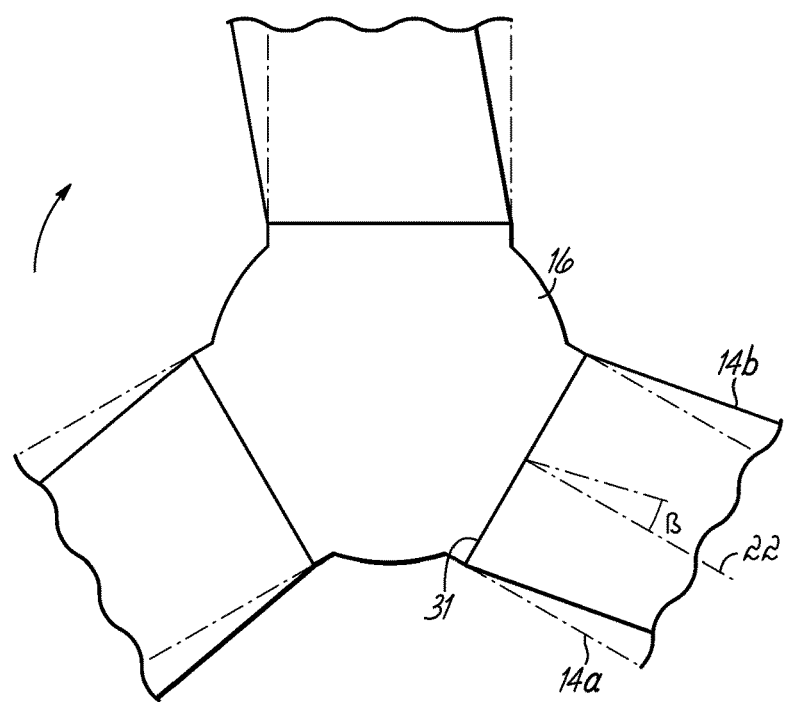
FIG. 9 shows a hub according to the invention with sweep.
Figure 10:
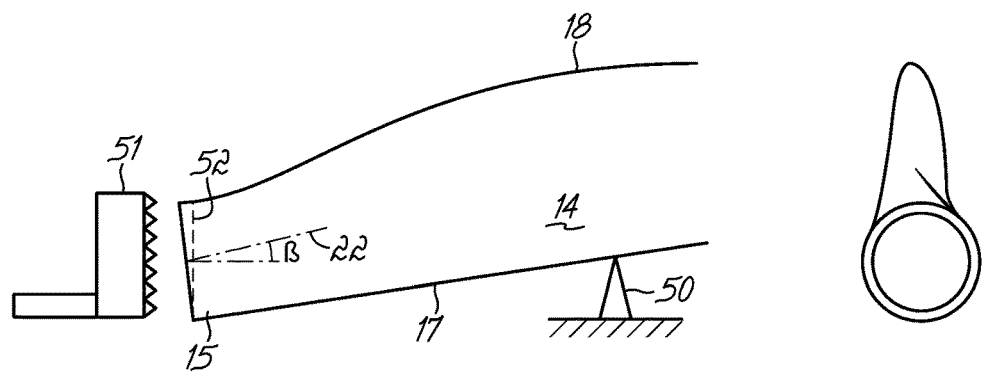
FIG. 10 shows a manufacturing method to provide sweep.

The principles behind the method of achieving the coning can also be used to apply sweep to the blade 14. FIG. 8 illustrates the principles of sweep where non-swept blades are shown in dashed lines 14a and swept blades are shown in solid lines 14b. The rotor rotates in a clockwise direction as indicated by the curved arrow. The swept blade 14b is swept backwards in the plane of rotation. In other words, the tips of the blades are swept aft of the roots of the blades. This arrangement reduces the loads experienced by the blades during use through the well-known effects of sweep-twist coupling, where the sweep allows the blade to twist under wind gusts to shed load. FIG. 9 shows in more detail the blades 14 and the hub 16. The swept blades 14b are swept relative to the pitch bearings 31, i.e. they are swept an angle β relative to the perpendicular from a mounting face of the pitch bearings 31. The sweep can be incorporated into the blade in the same manner as described with reference to FIGS. 7A to 7C. This is achieved by rotating the blade through 90 degrees as shown in FIG. 10 so that the trailing edge of the blade 18 faces upwards. A combination of coning and sweep is achieved through rotating the blade to a desired angle that will allow the grinding machine 51 to machine a mounting face 25 that is both coned and swept.

Figure 11:
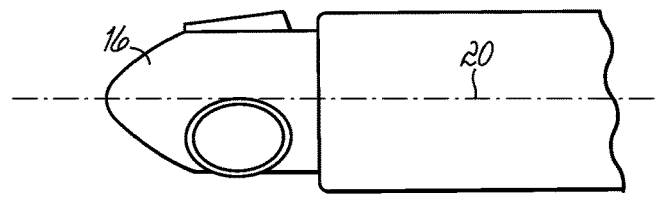
FIG. 11 shows a side view of a wind turbine nacelle and hub.

The invention provides blade coning and a method of producing the blade coning, but it should be appreciated that coning can also be achieved in the hub 16 by orientating the blade bearings 31 relative to the rotor axis 20 as shown in FIG. 11. For example the blade coning as described with reference to FIGS. 1 to 7 may provide 1 degree of coning and the hub coning may provide an additional 2 degrees of coning, thus resulting in a total cone angle of 3 degrees. In addition, the rotor axis 20 may actually be tilted by, for example 3 degrees, relative to the horizontal.

Figure 12A:
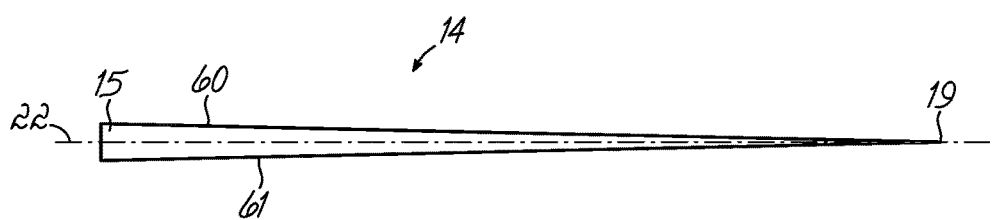
FIGS. 12A and 12B show side views of a wind turbine rotor blade.
Figure 12B:
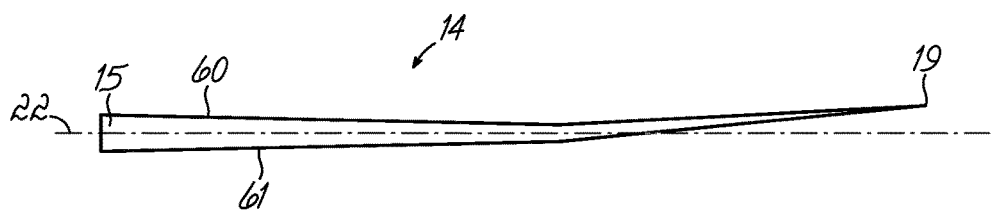

FIGS. 12A and 12B show how the blade axis 22 does not necessarily have to be aligned with the entire spanwise extent of the blade 14. FIGS. 12A and 12B show side views of the blade looking towards the leading edge or the trailing edge. The windward surface of the blade is designated as 60 and the leeward surface of the blade is designated as 61. In FIG. 12A the blade axis 22 extends from the root portion 15 and through the tip 19. However, the blade shown in FIG. 12B is not straight and is curved in its outer portion towards the windward side 60 such that the blade axis 22 does not pass through the tip 19. The outer portion of the blade may be curved towards the windward side such that when under high wind loads, the blade is deflected to a straight shape and this can be done to reduce loads on the wind turbine blades. It is important to note that the blade axis 22 is defined with reference to the root portion and the cone angle is measured with respect to the blade axis 22 as defined in the root portion.

The invention claimed is:

1. A wind turbine rotor blade comprising:
 a root portion having a substantially cylindrical shape and a longitudinal axis extending through a center of the root portion, the root portion having a mounting face;
 a plurality of bores in a wall of the root portion and extending from the mounting face into the root portion, the bores being configured to receive respective fasteners for connecting the wind turbine rotor blade to a wind turbine hub;
 wherein the plurality of bores are inclined at an angle relative to the longitudinal axis of the root portion to define a cone angle, wherein the root portion has a substantially circular cross section and the plurality of bores are formed in a circle around a centre point, and wherein the centre point is offset from the longitudinal axis of the root portion.

2. The wind turbine rotor blade according to claim 1, wherein the longitudinal axis of the root portion is inclined relative to a pitch axis of the rotor blade.

3. The wind turbine rotor blade according to claim 1, wherein the mounting face is in a plane that is inclined so that it is not normal to the longitudinal axis of the root portion.

4. The wind turbine rotor blade according to claim 1, wherein the plurality of bores are inclined at an angle relative to the longitudinal axis of the root portion to define a sweep angle.

5. The wind turbine rotor blade according to claim 1, wherein the plurality of bores are inclined relative to the longitudinal axis at an angle of between 1 degree and 5 degrees.

6. A wind turbine comprising:
 a tower;
 a nacelle connected to the top of the tower;
 a hub connected to the nacelle and a blade bearing connected to the hub; and a wind turbine rotor blade according to claim 1 mounted on the blade bearing.

7. The wind turbine according to claim 6, wherein the plurality of bores in the wind turbine rotor blade are inclined at an angle relative to the longitudinal axis of the root portion, such that a tip end of the blade is angled away from the tower.

8. The wind turbine according to claim 6, wherein the root portion of the rotor blade rotates in a first plane and a tip end of the blade rotates in a second plane, wherein the second plane is located upwind of the first plane.

9. The wind turbine according to claim 6, wherein the blade bearing is orientated such that a tip end of the blade is angled away from the tower.

10. A method of manufacturing a wind turbine rotor blade with a cone angle comprising the steps of:
 providing a wind turbine rotor blade having a root portion with a substantially cylindrical shape and a longitudinal axis extending through a center of the root portion;
 removing material from the root portion to provide a mounting face;
 forming a plurality of bores in a wall of the root portion extending from the mounting face into the root portion, the bores being configured to receive respective fasteners for connecting the wind turbine rotor blade to a wind turbine hub;
 wherein the step of forming the plurality of bores comprises forming the bores such that they are inclined at an angle relative to the longitudinal axis of the root portion to define cone angle, wherein the root portion has a substantially circular cross section and the plurality of bores are formed in a circle around a centre point, and wherein the centre point is offset from the longitudinal axis of the root portion.

11. The method according to claim 10, wherein the blade is inclined at an angle prior to the steps of removing material and forming the plurality of bores.

12. The method according to claim 10, wherein the step of forming the plurality of bores takes place prior to the step of removing material from the root portion to provide the mounting face.

13. The method according to claim 10, wherein the step of removing material from the root portion to provide the mounting face comprises grinding an end the root portion.

14. The method according to claim 10, wherein the step of forming the plurality of bores comprises drilling.

15. The method according to claim 10, wherein the plurality of bores are inclined relative to the longitudinal axis at an angle of between 1 degree and 5 degrees.

* * * * *